US010452357B2

(12) United States Patent
Tan et al.

(10) Patent No.: US 10,452,357 B2
(45) Date of Patent: Oct. 22, 2019

(54) GENERATION OF DISTINCTIVE VALUE BASED ON TRUE RANDOM INPUT

(71) Applicant: Intel Corporation, Santa Clara, CA (US)

(72) Inventors: Tat Kin Tan, Bayan Lepas (MY); Usman Sarwar, Penang (MY)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/977,830

(22) Filed: Dec. 22, 2015

(65) Prior Publication Data

US 2017/0177302 A1 Jun. 22, 2017

(51) Int. Cl.
  *G06F 7/58* (2006.01)
(52) U.S. Cl.
  CPC .................................. *G06F 7/588* (2013.01)
(58) Field of Classification Search
  None
  See application file for complete search history.

(56) References Cited

U.S. PATENT DOCUMENTS

| 6,831,980 | B1 * | 12/2004 | Borza | G06F 7/588 |
| | | | | 380/44 |
| 9,329,836 | B2 * | 5/2016 | Boenisch | G06F 7/588 |
| 2003/0069910 | A1 | 4/2003 | Kelly et al. | |
| 2009/0067618 | A1 | 3/2009 | Kumar et al. | |
| 2011/0144969 | A1 | 6/2011 | Dayka et al. | |
| 2012/0173599 | A1 | 7/2012 | Gao | |

OTHER PUBLICATIONS

"International Application Serial No. PCT/US2016/061544, International Search Report dated Feb. 22, 2017", 3 pgs.
"International Application Serial No. PCT/US2016/061544, Written Opinion dated Feb. 22, 2017", 9 pgs.

* cited by examiner

*Primary Examiner* — Michael D. Yaary
(74) *Attorney, Agent, or Firm* — Schwegman Lundberg & Woessner, P.A.

(57) ABSTRACT

Aspects of the disclosure are directed to solutions for generating a distinctive value in a computing device. A captured data gathering module is to interface with the plurality of data capture devices and to read data output from each of them. The data output has a randomness characteristic. A captured data aggregation module is to combine the data output from at least two different data capture devices to produce an aggregated output. A transformation module is to compute a transformation of the aggregated output to produce a distinctive value that is based on the randomness characteristic.

24 Claims, 5 Drawing Sheets

GENERATION OF DISTINCTIVE VALUE BASED ON TRUE RANDOM INPUT

TECHNICAL FIELD

Embodiments described herein generally relate to information processing and security, more particularly, to the generation of distinctive codes such as hashes.

BACKGROUND

Random numbers are used for a wide variety of purposes in the information processing fields, such as, without limitation, generating distinctive identifiers for databases records, computer processes, or other objects, data encryption keys and hash values, simulating or modeling complex phenomena, and for selecting random samples from larger data sets. Random numbers have been used in creative endeavors, such as generating music, and even in the literary and visual arts. Additionally, random number generation is essential in gambling and other games.

Producing a random number using a computer system continues to be a challenge. A truly random number is taken from a set of possible values, with each value being equally probable as a uniform distribution. In a sequence of random numbers, each selected number is ideally statistically independent of the others. A truly random number cannot be predicted, or estimated as falling within some range of values as a finite subset of a greater set of possible values.

A computer system executes its program instructions and, as such, is entirely predictable. Pseudorandom number generators (PRNGs) are computationally efficient ways to generate random-looking numbers, but the PRNG output is in fact deterministic, meaning that the next value of a pseudorandom sequence may be known if the sequence's starting point is known. In critical and security applications, PRNGs present a vulnerability to attackers seeking to break an encryption code.

True random number generators (TRNGs) obtain randomness from observation of physical events and introduce it into a computer. For instance, known techniques use timing between keypresses of a keyboard. However, the systems observing the events may themselves introduce bucketing and other granularity effects, which reduce the randomness in the observation of what is otherwise a legitimately random event. For instance, input buffering of keystrokes may cause keystroke-reading applications to interpret successive buffered keystrokes as appearing artificially close in time based on the time of reading of the keypresses from the buffer by the random-number-generating application. The problem of obtaining true random values by computer systems is sufficiently difficult that some services have gone to such lengths as using radioactive sources as sources for random physical events. This latter approach introduces numerous complexities, many of which are readily apparent, in addition, it introduces a vulnerability in the communication link with the radioactive-source monitoring system, which may be subject to attack.

A practical solution for the generation of a random, distinctive, value in computing systems is needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the invention are directed to utilizing data captured by a combination of data-capture input devices for random-value generation in a computing device. Captured data in the present context is data, storable in at least one non-transitory tangible medium, representing a physical event as sensed by one or more transducers. Examples of captured data include (without limitation) video data, audio data, device positional data (e.g., from GPS or terrestrial trilateration via radio signal), motion/acceleration data (e.g., via accelerometer or gyroscope), illumination data, pressure data, temperature data, device orientation data (e.g., via magnetometer or other compass), motion detection data, etc. Captured data may also include biometric data, such as fingerprint detector output, corneal scan information, etc., as well as physiologic data, such as blood pressure, pulse oximetry, electrocardiogram (EKG), and the like, and, additionally, parameter measurements, such as output from an industrial pressure sensor, flowmeter, proximity sensor, chemical detector, strain gauge.

A computing device in the present context may take any of a variety of device types. For instance, it may be a multi-functional device such as a smartphone, tablet, laptop, desktop PC, smartwatch, wearable form factor (e.g., smart glasses, or a device embedded in garment), etc. A computing device may have a variety of integrated data capture devices, or may be interfaced with a stand-alone data capture device, such as a video camera, sound recorder, security camera, security access device such as a doorbell, motion or perimeter breach detector, door lock, or other access control system. Moreover, a data capture device may constitute an external, wearable, or implantable medical or fitness-monitoring device. Examples include heart rate monitors, infusion pumps, electrocardiogram instruments, blood pressure instruments, ultrasound instruments, automated external defibrillators (AEDs), data loggers, motion monitors, pacemakers, implantable cardioverter-defibrillators (ICDs), etc. A data capture device may participate in Internet-of-things (IoT) networking. A data capture device may also include a parameter-measuring instrument, such as an industrial pressure sensor, flowmeter, proximity sensor, chemical detector, strain gauge, etc. Furthermore, it should be understood that a data capture device may be a part of a greater system, such as an unmanned aerial vehicle (UAV), for example.

Figure 1:
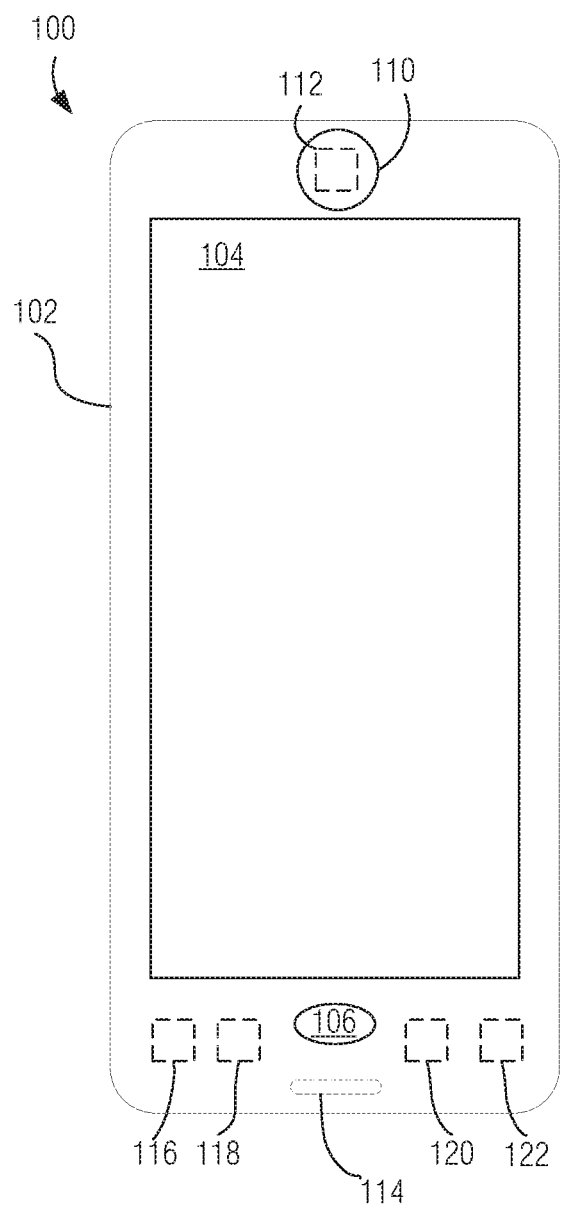
FIG. 1 is a block diagram illustrating some of the components of an example computing device according to an embodiment of the invention.

FIG. 1 is a block diagram illustrating some of the components of an example computing device 100 according to an embodiment. Computing device 100 is illustrated as a smartphone in this example, through it will be understood that computing device 100 is representative of other types of computing devices, which may have more or fewer data capture devices or other features than exemplary computing device 100. Computing device 100 has a housing 102 that encloses the interior components. Housing 102 may provide access to the interior of device 100 to some degree. For instance, in devices with a user-replaceable battery, flash memory card, or subscriber identity module (SIM) card, housing 102 may include a user-removable cover. In devices having a design that does not facilitate user access to the interior, housing 102 may nonetheless have a provision for permitting access to technicians so that certain components may be repaired or replaced if needed.

Computing device 100 further includes touchscreen 104, which may form a part of the overall enclosure of device 100 in cooperation with housing 102. Touchscreen 104 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, computing device 100 includes user input device 106, which in this example represents one or more user-operable input devices, such as button(s), keypad, keyboard, trackpad, mouse, etc.

As further depicted in FIG. 1, computing device 100 has several data capture devices, such as sensing transducers, the physical stimulation of which produces signaling that may be sampled, digitized, and stored as captured data. Camera 110 includes an image sensor 112, along with additional hardware for digitizing, processing, and storing portions of the image sensor 112 output. Camera 110 also includes optics that may form a portion of housing 102. Camera 110 may record still images, motion video, or both.

Microphone 114 includes audio capture circuitry that samples, digitizes, and stores portions of the signaling produced by microphone 114 in response to sensed acoustic stimulus. Microphone 114 is typically activated together with camera 110 when data capture device 100 is operated to record videos.

Global positioning system (GPS) receiver 116 includes an antenna and radio receiver circuitry to receive multiple signals being broadcast by a constellation of Earth-orbiting satellites, along with processing circuitry to discern the current position on the Earth of data capture device 100. Accelerometer 118 includes a multi-axis sensor that produces signaling in response to changes in motion, and electronics to sample and digitize that signaling. Magnetometer 120 includes sensors and supporting circuitry that detect the direction and intensity of the ambient magnetic field, or any externally-applied magnetic fields. Biometric sensor 122 includes an array of sensors for measuring a biometric indicator, such as a user's fingerprint, along with supporting circuitry.

Figure 2:
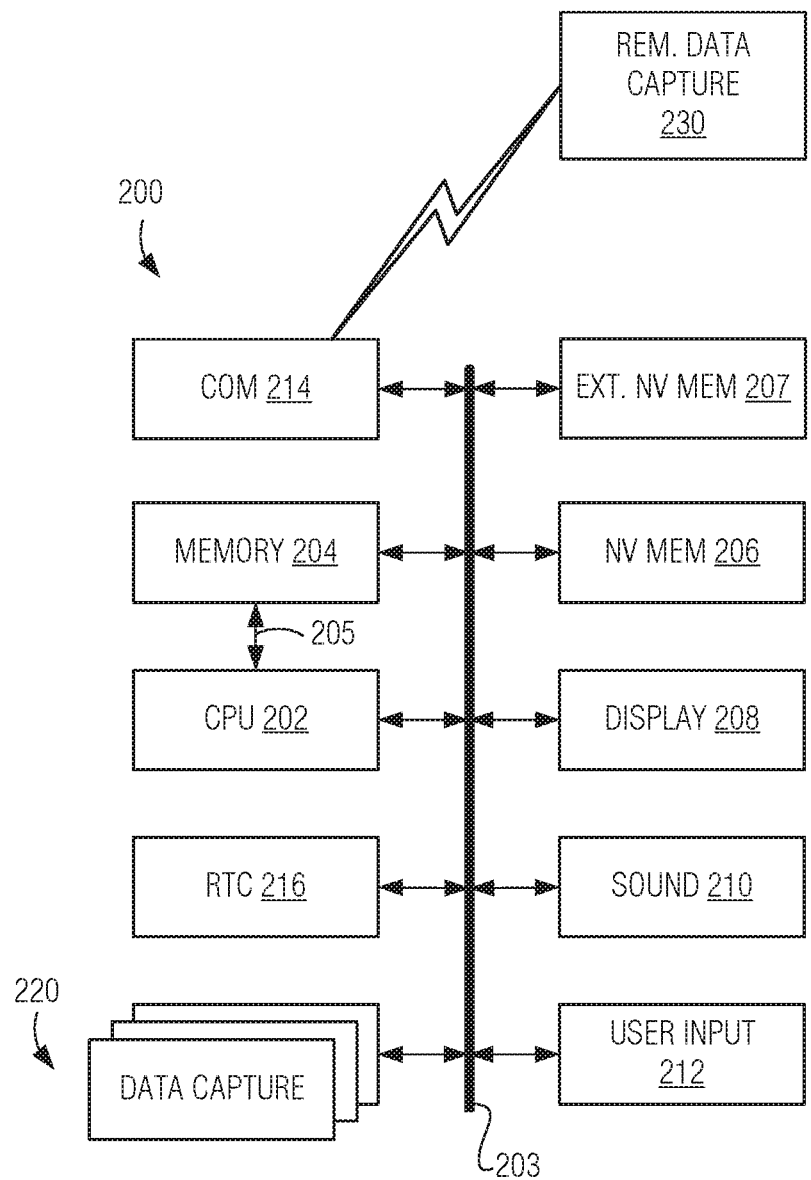
FIG. 2 is a block diagram illustrating an exemplary system architecture of a computing device such as the device of FIG. 1, according to an embodiment.

FIG. 2 is a block diagram illustrating an exemplary system architecture 200 of computing device 100 according to an embodiment. Central processor unit (CPU) 202 includes one or more microprocessors on which the overall functionality of computing device 100 is executed. CPU 202 is formed from hardware that is electrically interfaced with system link 203, which carries data and control signaling between the various components. As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using read-only memory (ROM), electrically-erasable programmable read-only memory (EEPROM), flash memory or other suitable non-volatile storage technology. Non-volatile memory 206 stores system and application software that is executed by CPU 202 and, in some cases, by processors present in one or more other components.

External non-volatile memory 207 includes an interface such as a secure digital (SD) card slot, which may accept removable storage media to be used as additional non-volatile data storage.

Display 208 includes display 104 and circuitry for interfacing the display 104 with the system, as well as video driving circuitry. Sound 210 contains circuitry for driving the audio output to a speaker or headphones, and the circuitry for interfacing with the system User input 212 contains the circuitry for interfacing with input devices such as input device 106. Communications block 214 represents communications circuitry and circuitry for interfacing the communications circuitry with the system. Communications block 214 may include a radio for communicating over a cellular network such as a network designed according to the Long-Term Evolution (LTE), LTE-Advanced, 5G or Global System for Mobile Communications (GSM) families of standards. Also, communications circuitry 214 may include a Wi-Fi communications radio according to the IEEE 801.11 family of standards, or a Bluetooth radio circuit according to the IEEE 802.15 family of standards. Real-time clock 216 includes circuitry that provides a clock that maintains the current date and time, and that interfaces the clock to the system.

Data capture devices 220 are integrated with computing device 200. According to various embodiments, data capture devices 220 include a plurality of different types of sensing transducers and their associated processing and interface circuitry, such as a camera, GPS, accelerometer, and biometric sensor.

In the case of a camera, the transducer may be an image sensor device, such as a charge-coupled device (CCD) array or a complementary metal-oxide semiconductor (CMOS)-based sensor. In the case of a GPS, the transducer is one or more GPS signal-receiving antennas. In the case of an accelerometer, the transducer may be a micro electro-mechanical system (MEMS)-based device utilizing capacitive, piezoelectric, or other suitable technology to produce electrical signaling. In the case of a biometric sensor, the transducer may be any suitable optical, capacitive, ultrasonic, chemical, or other sensor. It will be understood that these examples are provided herein for illustration and context, and are not meant to be limiting unless expressly enumerated in a particular claim.

The processing circuitry associated with each corresponding transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the transducer in a form that is readable by CPU 202.

Remote data capture device 230 is interfaced with CPU 202 via communication block 214, as depicted. Remote data capture device 230 may be any type of data capture device described above, or may be a different type of data capture device altogether.

According to some aspects of the embodiments described herein, the captured data provided by data capture devices 220, remote data capture device 230, or some combination thereof, is used to produce a random value, which in turn may be used for any suitable application of hash generation, cryptographic security, distinctive identification generation, or other application that benefits from the true randomness.

Figure 3:
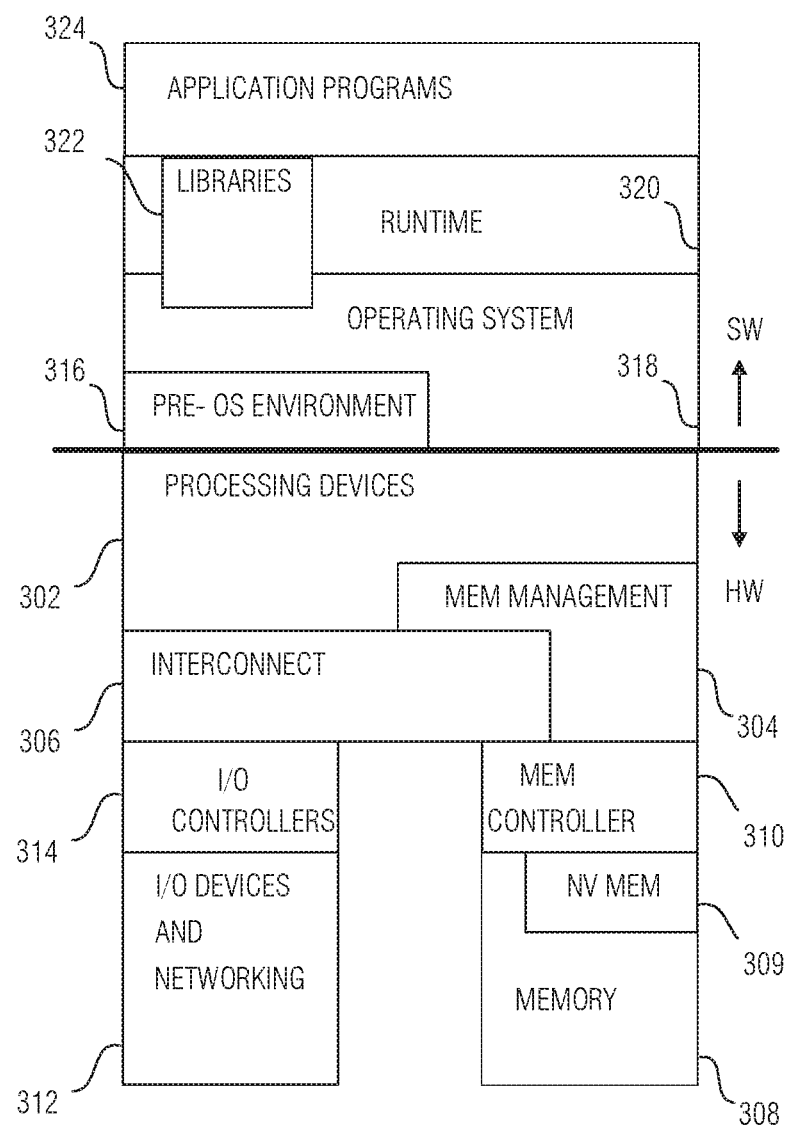
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (i.e., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc, as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, described in greater detail below, is responsible for initiating the launching of the operating system, but also provides an execution environment for embedded applications according to certain aspects of the invention. Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. With reference to FIG. 3, for instance, a module may include one, or any combination, of the blocks depicted, so long as at least one block from the HW side is included.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Figure 4:
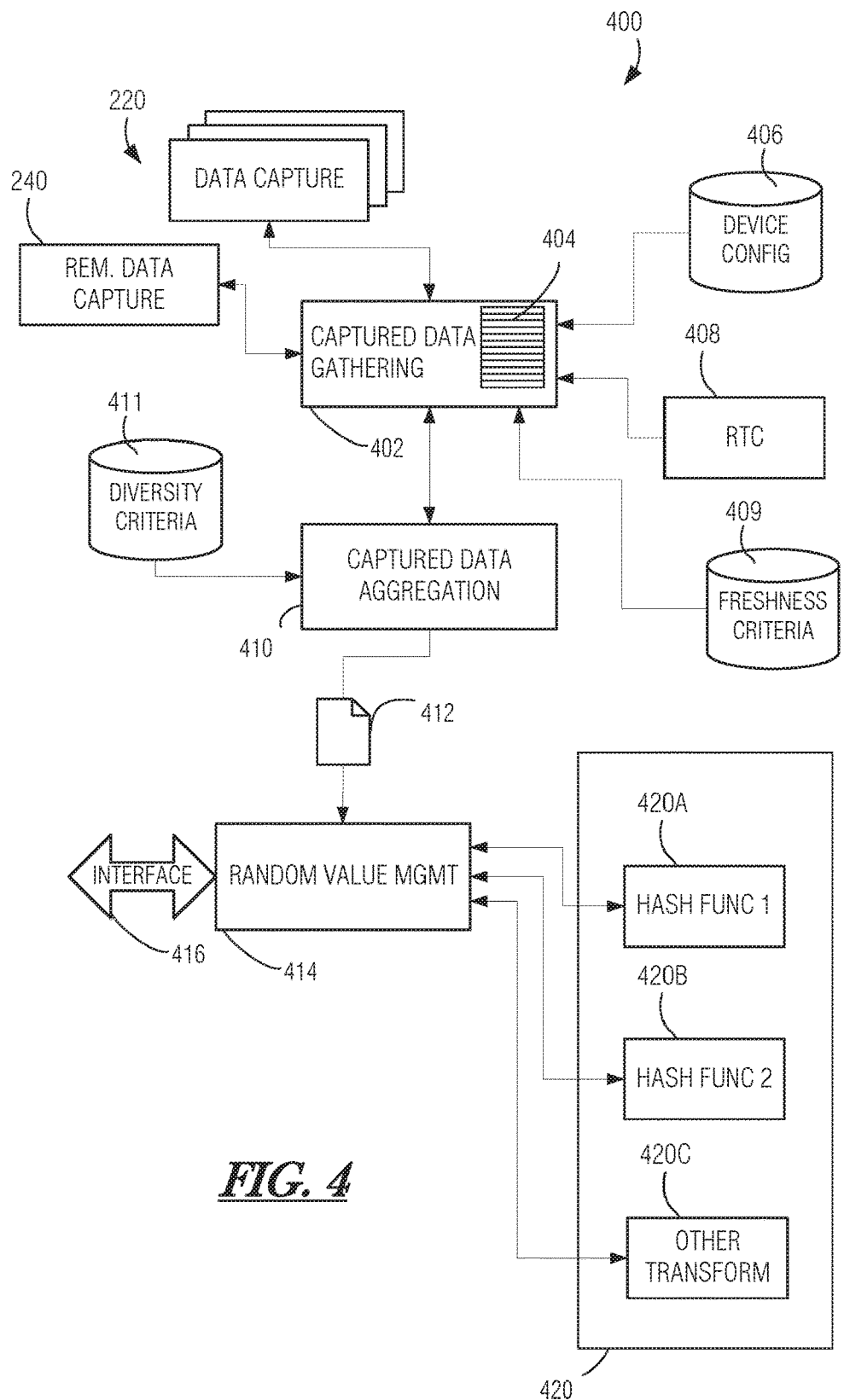
FIG. 4 is a block diagram illustrating a system for generating distinctive values based on true random input according to some embodiments.

FIG. 4 is a block diagram illustrating a system for generating distinctive values based on true random input according to some embodiments. The modules of exemplary system 400 may be realized using one or more computing devices such as the examples described above with reference to FIGS. 1-3. Notably, in various embodiments, exemplary system 400 may be implemented on one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

In exemplary system 400, captured data gathering module 402 interfaces with a plurality of data capture devices. As depicted, captured data gathering module 402 is interfaced with data capture devices 220 that are local to a particular computing device, as well as with remote data capture device 240. Captured data gathering module 404 is programmed, or otherwise configured, to read the current output data from each data capture device 220, 240, and store each capture device's most current output data in data structure 404.

In a related embodiment, captured data gathering module 402 issues commands to one or more of the data capture devices 220, 240, as needed, to trigger operation of data capture, set configuration parameters, enable a disabled device, and other essential commands to enable data gathering from a plurality of the data capture devices. In another related embodiment, captured data gathering module 402 reads device configuration information from device configuration database 406, which may be hosted on one or more computing devices that also host one or more of the data capture devices 220, 240. Device configuration database 406 provides an inventory of available data capture devices, along with instruction sets, as needed, for commanding corresponding data capture devices. According to this type of embodiment, captured data gathering module 402 includes instructions for reading device configuration database 406, extracting relevant instruction sets, and applying appropriate instructions to generate commands to data capture devices 220, 240.

In the embodiment depicted, captured data gathering module 402 is interfaced with real-time clock module 408, which operates to supply codes representing the current time. In a related embodiment, the current time from real-time clock 408 is applied to each item of captured data to add or otherwise incorporate a timestamp. In an example, the timestamp is incorporated by combining the current time indicia with the captured data item, e.g., using bit-wise exclusive-OR operations, addition, multiplication, bit-position shifting, etc., or some combination of such operations.

In another related embodiment, captured data gathering module 402 is programmed, or otherwise configured, to select only the most recent captured data output from each data capture device 220, 240. In an example, in data structure 404, each captured data item is associated with its corresponding data capture device 220, 240, and captured data gathering module 402 operates to supplant previous captured data items from each data capture device with the most recent captured data item. In another related embodiment, captured data gathering module 402 applies data freshness criteria 409 to the captured data, which when applied may impose a timeliness requirement on the captured data. For instance, in the case of the most recent captured data exceeding a data freshness threshold, that captured data may be excluded.

Captured data aggregation module 410 is programmed, or otherwise configured, to combine the captured items of data from multiple data capture devices 220, 240, which may be timestamped or otherwise modified by captured data gathering module 402. According to some embodiments, combining the data based on the outputs of multiple different data capture devices tends to benefit the true randomness of the random value generation process. A variety of suitable algorithms for achieving the combining of different data capture device outputs are contemplated according to embodiments. For instance, concatenation, bit-wise exclusive-OR operations, addition, multiplication, bit-position shifting, etc., or some combination of such operations, may be utilized.

In a related embodiment, captured data aggregation module 410 applies a set of diversity criteria 411, which may impose a requirement of capture device diversification in order for the captured data to be deemed valid for random value generation. In an example, the diversity criteria may simply require there to be a minimum quantity of data capture devices represented in the gathered captured device data. For instance, in various embodiments, the following minimum-quantity criteria may be applied: at least two; at least three; at least four. In a related embodiment, the diversity criteria may require the captured data to be from different classes of sensors. Examples of sensor classes may include:

User-input sensors (e.g., touchscreen actions, keypresses, mouse movements, etc.).
Ambient-environment sensors (e.g., photo/video image capture, sound capture, etc.).
Device-disposition sensors (e.g., GPS location, device orientation (e.g., magnetometer readings), accelerometer readings, gyrometer readings, pressure readings, etc.).
User-physiology sensors (e.g., biometric data, heart rate, blood pressure, pulse oximetry, EKG waveform parameters).

In an example, the diversity criteria 411 may require capture data from at least N different sensor classes to be represented, where N may be 2, 3, 4, etc.

In a related embodiment, the application of diversity criteria 411 may call for selecting or omitting captured data from certain data capture devices 220, 240. For example, in an embodiment, captured data aggregation module 410 is configured to preferentially use captured data from local data capture devices 220, over remote data capture devices 240. In a related embodiment, if the diversity criteria 411 is not met by the locally-available data capture devices 220, then captured data aggregation module 410 may be programmed to instruct captured data gathering module 402 to obtain captured data from remote data capture device 240.

In a related embodiment, captured data aggregation module 410 is programmed, or otherwise configured, to collapse large items of captured data into smaller data items. For instance, bitmap images, video frame buffer sequences, audio streams, etc., may be collapsed into a M-bit-wide representation suitable for use as a data item to be aggregated with other data items or as a hash-key input into a hashing function process. In the example of a large bitmap, for instance, the bitmap may be stored as an array in M-bit-wide memory registers spanning a large number of memory addresses. One process for collapsing the large data item is performing a bit-wise exclusive-OR operation for each bit position of the array. The result is a single data item, M-bits wide, that is derived based on every bit of the captured data item.

The aggregated output 412 of captured data from captured data aggregation module 410 is passed to random value management module 414. In an embodiment, the process of supplying aggregated output 412 to random value management module 414 is ongoing in system 400. In another embodiment, the process is initiated, concluded, and otherwise managed under the control of random value management module 414. A variety of other suitable approaches for collapsing large data items may be employed according to related embodiments.

In some embodiments, random value management module 414 is called by a process executing on a computing device that needs a random value. The calling may be via interface 416, which in one type of embodiment is an application programming interface (API). In a related embodiment, interface 416 includes device driver code that executes as part of the operating system (e.g., OS 318). In response to the call for a random value, random value management module 414 obtains aggregated output 412.

In a related embodiment, aggregated output 412 is further transformed by transform module 420. In some embodiments, transform module 420 includes one or more transform algorithms, such as hash functions, or other transform algorithms. In the embodiment depicted, transform module includes hash function 1 420A, hash function 2 420B, and another transform algorithm 420C. Hash function 1 may be a MD-5 hash function, for example. Hash function 2 may be a SHA-256 hash function, for example. It is contemplated that a variety of hash functions, for a variety of purposes may be employed in various embodiments. The hash functions may be cryptographic hash functions, or non-cryptographic hash functions. Other transform algorithm 420C may include an algorithm that operates to increase information entropy of aggregated output 412, or of the output of another algorithm of transform module 420. In another embodiment, other transform 420C may operate to make a series of aggregated outputs 412 more Gaussian in their statistical distribution. It will be understood that these are non-limiting examples of the contemplated transform algorithms which may be utilized as part of transform module 420.

The output of the one or more transform algorithm(s) of transform module 420 is a distinctive value which is, by a high probability, a unique value. Random value management module 414 passes the transform output to the calling application via interface 416.

Figure 5:
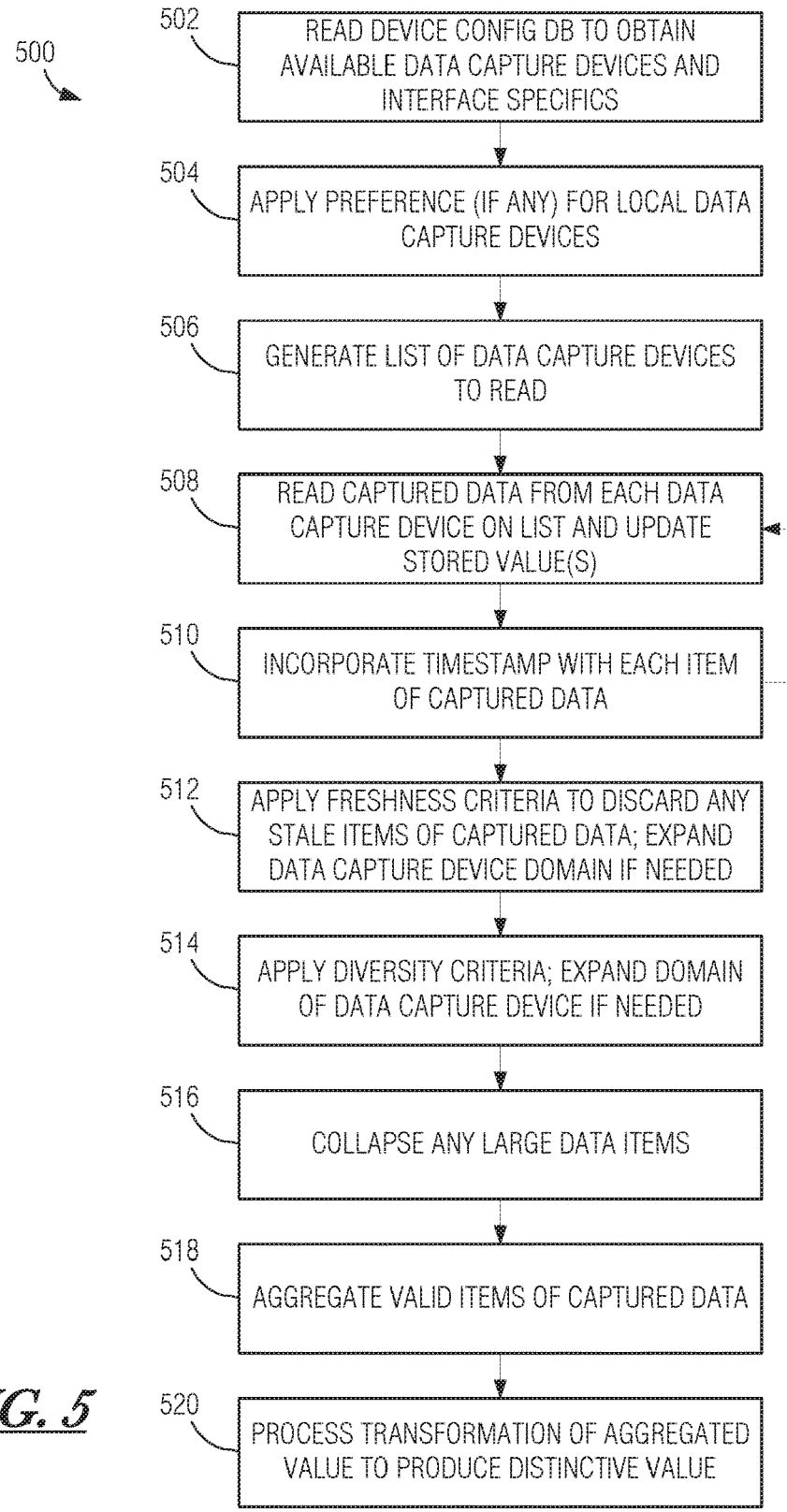
FIG. 5 is a flow diagram illustrating an example process of generating a distinctive value according to some embodiments.

FIG. 5 is a flow diagram illustrating an example process 500 of generating a distinctive value according to some embodiments. Process 500 may be performed by system 400 (FIG. 4), or by a system having a different architecture. Notably, process 500 is a machine-implemented process that operates autonomously (i.e., without user interaction), though the operation of the process may be user initiated, or automatically initiated. In addition, it is important to note that process 500 is a richly-featured embodiment that may be realized as described; in addition, portions of the process may be implemented while others are excluded in various embodiments. The following Additional Notes and Examples section details various combinations, without limitation, that are contemplated. It should also be noted that in various embodiments, certain process operations may be performed in a different ordering than depicted in FIG. 5.

Although not depicted in the diagram, the process may be initiated in various ways. In an example, portions of the process run continuously on a computing device, such as ongoing sampling, timestamping, and storage of capture device output data, for instance, such that initiation of the process involves initiating different portions at different times, some of which may be in response to external stimulus (e.g., a request from an application or a user).

According to exemplary process 500, at 502, the configuration of capture devices is read from a database (e.g., device configuration database 406) that may be stored locally on a computing device on which other parts of the process are carried out, or remotely. The configuration of capture devices may include identifiers of each available data capture device, as well as any interfacing specifics, such as command sets for particular data capture devices, etc.

At 504, if there is a configured preference for the use of local data capture devices over remotely-available data capture devices, that preference is applied in the selection of data captured devices from which to obtain data. The preference for local data capture devices may be motivated by a policy to avoid potential attack vectors, where the communications link to the remote data capture device is considered a potential attack vector. Accordingly, local or remote data capture devices, or some combination of the two, are selected for monitoring. The selections are represented by the generation of a list of data capture devices at 506.

At 508, the data captured from each data capture device on the list is gathered and stored. The storage of the captured data from each data capture device may be in volatile or non-volatile memory, and may be organized in a defined data structure (such as data structure 404, for example) or specially-allocated memory space. Also, the storage of the captured data may be performed such that previous data items from each corresponding capture device are replaced by the latest obtained values. In a related embodiment, historical data is also maintained for some time, and may be utilized in the generation of the random values.

As the captured data is gathered, a timestamp may be incorporated with each data item, as indicated at 510. In some embodiments, blocks 508-510 are executed iteratively for each gathered item of data to incorporate the timestamp immediately after the storing of the newly-captured data item. Incorporation of the timestamp may be accomplished in a variety of ways, such as concatenation, or some logical or arithmetic combining with the captured data itself (e.g., addition, multiplication, exclusive-OR computation, etc.).

At 512, data freshness criteria, such as data freshness criteria 409, for instance, is applied to ensure timeliness of the captured data. As a result of the application of the data freshness criteria, some or all of the captured data may be omitted from further operations. In a related embodiment, older data may be used with the provision that additional sources of random data are incorporated, such as the addition of captured data from other data capture devices, for example.

At 514, diversity criteria, such as diversity criteria 411, are applied to ensure that a suitably diverse variety of captured data is utilized. As described above, the diversity criteria may take into account quantity, classification, or some combination, of data capture devices. In response to application of the diversity criteria, the domain of data capture devices may be expanded to include captured data from one or more additional data capture devices.

At 516, large items of captured data are collapsed, or condensed, into a predefined size. This operation may be performed in any suitable manner that preserves the data entropy of the captured data item, according to some embodiments. At 518, the valid captured (and, where applicable, collapsed) data items from a plurality of different data capture devices that meet all applicable criteria previously applied, are aggregated into an aggregated output of captured data, such as aggregated output 412, for instance. The data aggregation operation at 518 may be the same, or different, from the operation performed at 516 to collapse large data items. The result of the data aggregation operation at 518 produces an aggregated value, such as the value of aggregated output 412.

In a related embodiment, operation 516 is incorporated with operation 518 such that large data items are concatenated with the data items from other data capture devices, and a single aggregation operation is performed on the complete set. In another related embodiment, the timestamping operation at 510 simply concatenates the timestamp to each item of captured data, and the aggregation operation at 518 merges the timestamping values in with the other data items and their respective timestamps.

At 520, the aggregated value is processed to transform the value according to one, or a combination, of hashing or other transformation algorithms, such as algorithms 420A-420C described above, for instance, to produce a distinctive value. The distinctive value may then be passed to a requester of the distinctive value, which may be a process, a user, a remote computing device, etc.

Advantageously, in some embodiments, the distinctive value is produced based on a combination of sources of random values in a computing device, while using readily-available data capture devices and, at the same time, minimizing, or reducing to a practical extent, susceptibility to tampering or attack on the process of distinctive value generation.

Additional Notes & Examples

Example 1 is a system for generating a distinctive value in a computing device, comprising: computing hardware, including a processor coupled to a data store and to a plurality of data capture devices, the computing hardware comprising instructions that, when executed, cause the computing hardware to implement: a captured data gathering module to interface with the plurality of data capture devices and to read data output from each of the plurality of data capture devices, the data output having a randomness characteristic; a captured data aggregation module to combine the data output from at least two different data capture devices of the plurality of data capture devices to produce an aggregated output; and a transformation module to compute a transformation of the aggregated output to produce a distinctive value that is based on the randomness characteristic.

In Example 2, the subject matter of Example 1 optionally includes, wherein the plurality of data capture devices includes at least two data capture devices including a type of sensor selected from the group consisting of: a user-input sensor, an ambient environment sensor, a device disposition sensor, and a user physiology sensor.

In Example 3, the subject matter of any one or more of Examples 1-2 optionally include, wherein the plurality of data capture devices includes at least two different data capture devices, each having a different types of sensor selected from the group consisting of: a user-input sensor, an ambient environment sensor, a device disposition sensor, and a user physiology sensor.

In Example 4, the subject matter of any one or more of Examples 1-3 optionally include, wherein the plurality of data capture devices includes at least two different data capture devices that operably produce corresponding different types of captured data selected from the group consisting of: video capture data, audio capture data, device positional data, device motion/acceleration data, illumination data, device orientation data, user biometric data, user physiology data, and parameter measurement data.

In Example 5, the subject matter of any one or more of Examples 1-4 optionally include, wherein the system is incorporated in a single computing device.

In Example 6, the subject matter of any one or more of Examples 1-5 optionally include, wherein the system is distributed among a plurality of communicatively-coupled computing devices.

In Example 7, the subject matter of any one or more of Examples 1-6 optionally include, wherein the plurality of data capture devices includes at least one data capture device that is a part of the computing hardware.

In Example 8, the subject matter of any one or more of Examples 1-7 optionally include, wherein the plurality of data capture devices includes at least one data capture device that is remote from the computing hardware.

In Example 9, the subject matter of any one or more of Examples 1-8 optionally include, wherein the captured data gathering module is operatively coupled with a device configuration database that identifies the plurality of the data capture devices and interfacing information corresponding to at least one of the plurality of the data capture devices.

In Example 10, the subject matter of any one or more of Examples 1-9 optionally include, wherein the captured data gathering module is to preferentially read captured data from a first subset of the data capture devices that are local to the computing hardware, over captured data from a second subset of the data capture devices that are remote from the computing hardware.

In Example 11, the subject matter of any one or more of Examples 1-10 optionally include, wherein the captured data gathering module is to combine a timestamp with the data output from at least one of the plurality of capture devices.

In Example 12, the subject matter of any one or more of Examples 1-11 optionally include, wherein the captured data gathering module is to apply data freshness criteria to the data output from at least one of the plurality of capture devices, wherein any items of data exceeding a freshness threshold are disregarded from further processing.

In Example 13, the subject matter of any one or more of Examples 1-12 optionally include, wherein the captured data gathering module is to select only current items of data of the data output from each of the plurality of capture devices for access by the captured data aggregation module.

In Example 14, the subject matter of any one or more of Examples 1-13 optionally include, wherein the captured data aggregation module is to apply diversity criteria that imposes a diversification requirement for use of the data capture devices.

In Example 15, the subject matter of Example 14 optionally includes, wherein the diversity criteria requires captured data from a minimum quantity of data capture devices.

In Example 16, the subject matter of any one or more of Examples 14-15 optionally include, wherein the diversity criteria requires captured data from data capture devices having different type classifications.

In Example 17, the subject matter of Example 16 optionally includes, wherein the diversity criteria requires captured data from different data capture devices from at least two different type classifications selected from the group consisting of: a user-input sensor, an ambient environment sensor, a device disposition sensor, and a user physiology sensor.

In Example 18, the subject matter of any one or more of Examples 16-17 optionally include, wherein the transformation module includes at least one hash function computation module.

In Example 19, the subject matter of any one or more of Examples 16-18 optionally include, wherein the randomness characteristic includes true randomness.

Example 20 is at least one machine-readable medium comprising instructions that, when executed by computing hardware, including a processor coupled to a data store and to a plurality of data capture devices, cause the computing hardware to implement: a captured data gathering module to interface with the plurality of data capture devices and to read data output from each of the plurality of data capture devices, the data output having a randomness characteristic; a captured data aggregation module to combine the data output from at least two different data capture devices of the plurality of data capture devices to produce an aggregated output; and a transformation module to compute a transformation of the aggregated output to produce a distinctive value that is based on the randomness characteristic.

In Example 21, the subject matter of Example 20 optionally includes, wherein the plurality of data capture devices includes at least two data capture devices including a type of sensor selected from the group consisting of: a user-input sensor, an ambient environment sensor, a device disposition sensor, and a user physiology sensor.

In Example 22, the subject matter of any one or more of Examples 20-21 optionally include, wherein the plurality of data capture devices includes at least two different data capture devices, each having a different types of sensor selected from the group consisting of: a user-input sensor, an ambient environment sensor, a device disposition sensor, and a user physiology sensor.

In Example 23, the subject matter of any one or more of Examples 20-22 optionally include, wherein the plurality of data capture devices includes at least two different data capture devices that operably produce corresponding different types of captured data selected from the group consisting of video capture data, audio capture data, device positional data, device motion/acceleration data, illumination data, device orientation data, user biometric data, user physiology data, and parameter measurement data.

In Example 24, the subject matter of any one or more of Examples 20-23 optionally include, wherein the plurality of data capture devices includes at least one data capture device that is a part of the computing hardware.

In Example 25, the subject matter of any one or more of Examples 20-24 optionally include, wherein the plurality of data capture devices includes at least one data capture device that is remote from the computing hardware.

In Example 26, the subject matter of any one or more of Examples 20-25 optionally include, wherein the captured data gathering module is operatively coupled with a device configuration database that identifies the plurality of the data capture devices and interfacing information corresponding to at least one of the plurality of the data capture devices.

In Example 27, the subject matter of any one or more of Examples 20-26 optionally include, wherein the captured data gathering module is to preferentially read captured data from a first subset of the data capture devices that are local to the computing hardware, over captured data from a second subset of the data capture devices that are remote from the computing hardware.

In Example 28, the subject matter of any one or more of Examples 20-27 optionally include, wherein the captured data gathering module is to combine a timestamp with the data output from at least one of the plurality of capture devices.

In Example 29, the subject matter of any one or more of Examples 20-28 optionally include, wherein the captured data gathering module is to apply data freshness criteria to the data output from at least one of the plurality of capture devices, wherein any items of data exceeding a freshness threshold are disregarded from further processing.

In Example 30, the subject matter of any one or more of Examples 20-29 optionally include, wherein the captured data gathering module is to select only current items of data of the data output from each of the plurality of capture devices for access by the captured data aggregation module.

In Example 31, the subject matter of any one or more of Examples 20-30 optionally include, wherein the captured data aggregation module is to apply diversity criteria that imposes a diversification requirement for use of the data capture devices.

In Example 32, the subject matter of Example 31 optionally includes, wherein the diversity criteria requires captured data from a minimum quantity of data capture devices.

In Example 33, the subject matter of any one or more of Examples 31-32 optionally include, wherein the diversity criteria requires captured data from data capture devices having different type classifications.

In Example 34, the subject matter of Example 33 optionally includes, wherein the diversity criteria requires captured data from different data capture devices from at least two different type classifications selected from the group consisting of a user-input sensor, an ambient environment sensor, a device disposition sensor, and a user physiology sensor.

In Example 35, the subject matter of any one or more of Examples 33-34 optionally include, wherein the transformation module includes at least one hash function computation module.

In Example 36, the subject matter of any one or more of Examples 33-35 optionally include, wherein the randomness characteristic includes true randomness.

Example 37 is a method for generating a distinctive value in a computing device that includes computing hardware, including a processor coupled to a data store and to a plurality of data capture devices, the method comprising: interfacing, by the computing device, with the plurality of data capture devices and reading, by the computing device, data output from each of the plurality of data capture devices, the data output having a randomness characteristic; combining, by the computing device, the data output from at least two different data capture devices of the plurality of data capture devices to produce an aggregated output; and computing, by the computing device, a transformation of the aggregated output to produce a distinctive value that is based on the randomness characteristic.

In Example 38, the subject matter of Example 37 optionally includes, wherein in interfacing with the plurality of data capture devices, the plurality of data capture devices includes at least two data capture devices including a type of sensor selected from the group consisting of: a user-input sensor, an ambient environment sensor, a device disposition sensor, and a user physiology sensor.

In Example 39, the subject matter of any one or more of Examples 37-38 optionally include, wherein in interfacing with the plurality of data capture devices, the plurality of data capture devices includes at least two different data capture devices, each having a different types of sensor selected from the group consisting of: a user-input sensor, an ambient environment sensor, a device disposition sensor, and a user physiology sensor.

In Example 40, the subject matter of any one or more of Examples 37-39 optionally include, wherein in interfacing with the plurality of data capture devices, the plurality of data capture devices includes at least two different data capture devices that operably produce corresponding different types of captured data selected from the group consisting of: video capture data, audio capture data, device positional data, device motion/acceleration data, illumination data, device orientation data, user biometric data, user physiology data, and parameter measurement data.

In Example 41, the subject matter of any one or more of Examples 37-40 optionally include, wherein in interfacing with the plurality of data capture devices, the plurality of data capture devices includes at least one data capture device that is a part of the computing hardware.

In Example 42, the subject matter of any one or more of Examples 37-41 optionally include, wherein in interfacing with the plurality of data capture devices, the plurality of data capture devices includes at least one data capture device that is remote from the computing hardware.

In Example 43, the subject matter of any one or more of Examples 37-42 optionally include, further comprising: reading a device configuration database to access information that identifies the plurality of the data capture devices and interfacing information corresponding to at least one of the plurality of the data capture devices.

In Example 44, the subject matter of any one or more of Examples 37-43 optionally include, wherein in reading the data output, the captured data is preferentially read from a first subset of the data capture devices that are local to the computing hardware, over captured data from a second subset of the data capture devices that are remote from the computing hardware.

In Example 45, the subject matter of any one or more of Examples 37-44 optionally include, wherein a timestamp is combined with the data output from at least one of the plurality of capture devices.

In Example 46, the subject matter of any one or more of Examples 37-45 optionally include, wherein data freshness criteria is applied to the data output from at least one of the plurality of capture devices, wherein any items of data exceeding a freshness threshold are disregarded from further processing.

In Example 47, the subject matter of any one or more of Examples 37-46 optionally include, wherein in reading the data output, only current items of data of the data output from each of the plurality of capture devices is selected for access by the captured data aggregation module.

In Example 48, the subject matter of any one or more of Examples 37-47 optionally include, wherein in combining the data output from the at least two different data capture devices, diversity criteria is applied that imposes a diversification requirement for use of the data capture devices.

In Example 49, the subject matter of Example 48 optionally includes, wherein the diversity criteria requires captured data from a minimum quantity of data capture devices.

In Example 50, the subject matter of any one or more of Examples 48-49 optionally include, wherein the diversity criteria requires captured data from data capture devices having different type classifications.

In Example 51, the subject matter of Example 50 optionally includes, wherein the diversity criteria requires captured data from different data capture devices from at least two different type classifications selected from the group consisting of: a user-input sensor, an ambient environment sensor, a device disposition sensor, and a user physiology sensor.

In Example 52, the subject matter of any one or more of Examples 50-51 optionally include, wherein in computing the transformation, at least one hash function is computed.

In Example 53, the subject matter of any one or more of Examples 50-52 optionally include, wherein the randomness characteristic includes true randomness.

Example 54 is a system for generating a distinctive value in a computing device that includes computing hardware, including a processor coupled to a data store and to a plurality of data capture devices, the system comprising: means for interfacing with the plurality of data capture devices; means for reading data output from each of the plurality of data capture devices, the data output having a randomness characteristic; means for combining the data output from at least two different data capture devices of the plurality of data capture devices to produce an aggregated output; and means for computing a transformation of the aggregated output to produce a distinctive value that is based on the randomness characteristic.

In Example 55, the subject matter of Example 54 optionally includes, wherein the plurality of data capture devices includes at least two data capture devices including a type of sensor selected from the group consisting of: a user-input sensor, an ambient environment sensor, a device disposition sensor, and a user physiology sensor.

In Example 56, the subject matter of any one or more of Examples 54-55 optionally include, wherein the plurality of data capture devices includes at least two different data capture devices, each having a different types of sensor selected from the group consisting of: a user-input sensor, an ambient environment sensor, a device disposition sensor, and a user physiology sensor.

In Example 57, the subject matter of any one or more of Examples 54-56 optionally include, wherein the plurality of data capture devices includes at least two different data capture devices that operably produce corresponding different types of captured data selected from the group consisting of: video capture data, audio capture data, device positional data, device motion/acceleration data, illumination data, device orientation data, user biometric data, user physiology data, and parameter measurement data.

In Example 58, the subject matter of any one or more of Examples 54-57 optionally include, wherein the system is incorporated in a single computing device.

In Example 59, the subject matter of any one or more of Examples 54-58 optionally include, wherein the system is distributed among a plurality of communicatively-coupled computing devices.

In Example 60, the subject matter of any one or more of Examples 54-59 optionally include, wherein the plurality of data capture devices includes at least one data capture device that is a part of the computing hardware.

In Example 61, the subject matter of any one or more of Examples 54-60 optionally include, wherein the plurality of data capture devices includes at least one data capture device that is remote from the computing hardware.

In Example 62, the subject matter of any one or more of Examples 54-61 optionally include, further comprising: means for reading a device configuration database to access information that identifies the plurality of the data capture devices.

In Example 63, the subject matter of any one or more of Examples 54-62 optionally include, wherein the means for reading the data output are to preferentially read from a first subset of the data capture devices that are local to the computing hardware, over captured data from a second subset of the data capture devices that are remote from the computing hardware.

In Example 64, the subject matter of any one or more of Examples 54-63 optionally include, wherein a timestamp is combined with the data output from at least one of the plurality of capture devices.

In Example 65, the subject matter of any one or more of Examples 54-64 optionally include, wherein data freshness criteria is applied to the data output from at least one of the plurality of capture devices, wherein any items of data exceeding a freshness threshold are disregarded from further processing.

In Example 66, the subject matter of any one or more of Examples 54-65 optionally include, wherein the means for reading the data output are to select only current items of data of the data output from each of the plurality of capture devices for access by the means for combining.

In Example 67, the subject matter of any one or more of Examples 54-66 optionally include, wherein the means for combining the data output from the at least two different data capture devices are to apply diversity criteria that imposes a diversification requirement for use of the data capture devices.

In Example 68, the subject matter of Example 67 optionally includes, wherein the diversity criteria requires captured data from a minimum quantity of data capture devices.

In Example 69, the subject matter of any one or more of Examples 67-68 optionally include, wherein the diversity criteria requires captured data from data capture devices having different type classifications.

In Example 70, the subject matter of Example 69 optionally includes, wherein the diversity criteria requires captured data from different data capture devices from at least two different type classifications selected from the group consisting of: a user-input sensor, an ambient environment sensor, a device disposition sensor, and a user physiology sensor.

In Example 71, the subject matter of any one or more of Examples 69-70 optionally include, wherein the means for computing the transformation include means for computing at least one hash function.

In Example 72, the subject matter of any one or more of Examples 69-71 optionally include, wherein the randomness characteristic includes true randomness.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for generating a distinctive value in a computing device, comprising:
   computing hardware, including a processor coupled to a data store and to a plurality of data capture devices, the computing hardware comprising instructions that, when executed, cause the computing hardware to:
   interface with the plurality of data capture devices including at least one video-capture;
   read data output from each of the plurality of data capture devices, the data output having a randomness characteristic based on a state or occurrence that is independent of the operation of the computing device;
   access a device configuration database to retrieve:
      an inventory of the plurality of data capture devices; and
      instruction sets to command the plurality of data capture devices;
   combine the data output from at least two different data capture devices of the plurality of data capture devices, using the inventory of the plurality of data capture devices and the instruction sets, to produce an aggregated output, wherein diversity criteria is applied that imposes a diversification requirement for use of the data capture devices; and compute a transformation of the aggregated output to produce a distinctive value that is based on the randomness characteristic.

2. The system of claim 1, wherein the plurality of data capture devices includes at least two data capture devices including a type of sensor selected from the group consisting of:
an ambient environment sensor, a device disposition sensor, and a user physiology sensor.

3. The system of claim 1, wherein the plurality of data capture devices includes at least two different data capture devices, each having a different types of sensor selected from the group consisting of:
an ambient environment sensor, a device disposition sensor, and a user physiology sensor.

4. The system of claim 1, wherein the plurality of data capture devices includes at least two different data capture devices that operably produce corresponding different types of captured data selected from the group consisting of:
video capture data, audio capture data, device positional data, device motion/acceleration data, illumination data, device orientation data, user biometric data, user physiology data, and parameter measurement data.

5. The system of claim 1, wherein the device configuration database identifies the plurality of the data capture devices and interfacing information corresponding to at least one of the plurality of the data capture devices.

6. The system of claim 1, wherein the instructions further cause the computing hardware to read captured data from a first subset of the data capture devices that are local to the computing hardware, over captured data from a second subset of the data capture devices that are remote from the computing hardware.

7. The system of claim 1, wherein the instructions further cause the computing hardware to combine a timestamp with the data output from at least one of the plurality of data capture devices.

8. The system of claim 1, wherein the instructions further cause the computing hardware to apply data freshness criteria to the data output from at least one of the plurality of data capture devices, wherein any items of data exceeding a freshness threshold are disregarded from further processing.

9. The system of claim 1, wherein the instructions further cause the computing hardware to select only current items of data of the data output from each of the plurality of data capture devices.

10. The system of claim 1, wherein the diversity criteria requires captured data from a minimum quantity of data capture devices.

11. The system of claim 1, wherein the diversity criteria requires captured data from data capture devices having different type classifications.

12. The system of claim 11, wherein the diversity criteria requires captured data from different data capture devices from at least two different type classifications selected from the group consisting of:
a user-input sensor, an ambient environment sensor, a device disposition sensor, and a user physiology sensor.

13. The system of claim 1, wherein to interface with the plurality of data capture devices, the instructions further cause the computing hardware to issue commands, using the instruction sets retrieved from the device configuration database, to the plurality of data capture devices to perform at least one of:
trigger an operation of data capture;
set configuration parameters for the plurality of data capture devices; or
enable a disabled data capture device.

14. The system of claim 1, wherein the distinctive value is a hash key.

15. At least one non-transitory machine-readable medium comprising instructions that, when executed by computing hardware, including a processor coupled to a data store and to a plurality of data capture devices, cause the computing hardware to:
interface with the plurality of data capture devices, including at least one video-capture device;
read data output from each of the plurality of data capture devices, the data output having a randomness characteristic based on a state or occurrence that is independent of the operation of the computing device;
access a device configuration database to:
retrieve an inventory of the plurality of data capture devices; and
instruction sets to command the plurality of data capture devices;
combine the data output from at least two different data capture devices of the plurality of data capture devices, using the inventory of the plurality of data capture devices and the instruction sets, to produce an aggregated output, wherein apply diversity criteria is applied that imposes a diversification requirement for use of the data capture devices; and
compute a transformation of the aggregated output to produce a distinctive value that is based on the randomness characteristic.

16. The at least one machine-readable medium of claim 15, wherein the instructions further cause the computing hardware to read captured data from a first subset of the plurality of data capture devices that are local to the computing hardware, over captured data from a second subset of the plurality of data capture devices that are remote from the computing hardware.

17. The at least one non-transitory machine-readable medium of claim 15, wherein the instructions further cause the computing hardware to apply data freshness criteria to the data output from at least one of the plurality of data capture devices, wherein any items of data exceeding a freshness threshold are disregarded from further processing.

18. The at least one non-transitory machine-readable medium of claim 15, wherein the diversity criteria requires captured data from data capture devices having different type classifications.

19. A method for generating a distinctive value in a computing device that includes computing hardware, including a processor coupled to a data store and to a plurality of data capture devices, the method comprising:
interfacing, by the computing device, with the plurality of data capture devices, including at least one video-capture device;
reading, by the computing device, data output from each of the plurality of data capture devices, the data output having a randomness characteristic based on a state or occurrence that is independent of the operation of the computing device;
retrieve, from the data store, an inventory of the plurality of data capture devices;
retrieve, from the data store, instruction sets to command the plurality of data capture devices;
combining, by the computing device, the data output from at least two different data capture devices of the plurality of data capture devices, using the inventory of the plurality of data capture devices and the instruction sets, to produce an aggregated output;

applying, by the computing device, diversity criteria that imposes a diversification requirement for use of the data capture devices, and computing, by the computing device, a transformation of the aggregated output to produce a distinctive value that is based on the randomness characteristic.

20. The method of claim 19, further comprising:

reading a device configuration database to access information that identifies the plurality of the data capture devices and interfacing information corresponding to at least one of the plurality of the data capture devices.

21. The method of claim 19, wherein in reading the data output, the captured data is preferentially read from a first subset of the data capture devices that are local to the computing hardware, over captured data from a second subset of the data capture devices that are remote from the computing hardware.

22. The method of claim 19, wherein a timestamp is combined with the data output from at least one of the plurality of capture devices.

23. The method of claim 19, wherein data freshness criteria is applied to the data output from at least one of the plurality of capture devices, wherein any items of data exceeding a freshness threshold are disregarded from further processing.

24. The method of claim 19, wherein in reading the data output, only current items of data of the data output from each of the plurality of capture devices is selected.

* * * * *

UNITED STATES PATENT AND TRADEMARK OFFICE
CERTIFICATE OF CORRECTION

PATENT NO. : 10,452,357 B2  
APPLICATION NO. : 14/977830  
DATED : October 22, 2019  
INVENTOR(S) : Tan et al.

Page 1 of 1

It is certified that error appears in the above-identified patent and that said Letters Patent is hereby corrected as shown below:

On the Title Page

In Column 2, under "U.S. Patent Documents", Line 6, after "Gao", insert
--¶FOREIGN PATENT DOCUMENTS
WO 2007148244 A1 12/2007--

In the Claims

In Column 20, Line 32, in Claim 16, after "one", insert --non-transitory--

Signed and Sealed this
Seventh Day of July, 2020

Andrei Iancu
*Director of the United States Patent and Trademark Office*